United States Patent
Lucey

(10) Patent No.: US 9,747,695 B2
(45) Date of Patent: Aug. 29, 2017

(54) SYSTEM AND METHOD OF TRACKING AN OBJECT

(71) Applicant: COMMONWEALTH SCIENTIFIC AND INDUSTRIAL RESEARCH ORGANISATION, Campbell, ACT (AU)

(72) Inventor: Simon Michael Lucey, The Gap (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 18 days.

(21) Appl. No.: 14/785,557

(22) PCT Filed: Apr. 17, 2014

(86) PCT No.: PCT/AU2014/000451
§ 371 (c)(1),
(2) Date: Oct. 19, 2015

(87) PCT Pub. No.: WO2014/169346
PCT Pub. Date: Oct. 23, 2014

(65) Prior Publication Data
US 2016/0071287 A1 Mar. 10, 2016

(30) Foreign Application Priority Data
Apr. 19, 2013 (AU) ................................. 2013901579

(51) Int. Cl.
*G06K 9/00* (2006.01)
*G06T 7/20* (2017.01)
(Continued)

(52) U.S. Cl.
CPC ........ *G06T 7/2046* (2013.01); *G06K 9/00261* (2013.01); *G06K 9/00281* (2013.01);
(Continued)

(58) Field of Classification Search
CPC .................................... G06K 9/00; G06T 7/00
(Continued)

(56) References Cited

U.S. PATENT DOCUMENTS

| 5,048,103 A * | 9/1991 | Leclerc ................ G06K 9/4642 378/98.12 |
| 5,774,591 A * | 6/1998 | Black ................. G06K 9/00315 382/118 |

(Continued)

OTHER PUBLICATIONS

International Search Report and Written Opinion dated May 19, 2014 of International Patent Application No. PCT/AU2014/000451, 13 pages.
(Continued)

*Primary Examiner* — Abolfazl Tabatabai
(74) *Attorney, Agent, or Firm* — Kilpatrick Townsend & Stockton LLP

(57) ABSTRACT

The invention relates to detecting and tracking objects in a sequence of images. In particular, a method, software and system for tracking a non-rigid object in a plurality of images. Initially, a first set of parameters for a parameterized shape model are generated (410) based on a first image. Then a second set of parameters are generated (415) for the parameterized shape model by fitting the parameterized shape model to the object in a second image of the plurality of images. This fitting is according to (i) the one or more constraints defined independently of the object or (ii) the first set of parameters. Also, the first and second sets of parameters define a tracking of the non-rigid object between the first and second images.

16 Claims, 5 Drawing Sheets

(51) Int. Cl.
*G06T 7/246* (2017.01)
*H04N 5/225* (2006.01)

(52) U.S. Cl.
CPC .... *G06T 7/251* (2017.01); *G06T 2207/10016* (2013.01); *G06T 2207/30201* (2013.01)

(58) Field of Classification Search
USPC .......... 382/103, 107, 236; 348/169–172, 352
See application file for complete search history.

(56) References Cited

U.S. PATENT DOCUMENTS

| | | | | |
|---|---|---|---|---|
| 6,967,658 B2* | 11/2005 | Hunter | ................. | G06T 3/0093 |
| | | | | 345/473 |
| 8,705,826 B2* | 4/2014 | Liu | ......................... | A61B 3/12 |
| | | | | 382/131 |
| 9,208,567 B2* | 12/2015 | Solem | ................... | G06T 7/0046 |

OTHER PUBLICATIONS

Saragih et al., "Deformable Model Fitting by Regularized Landmark Mean-Shift", *Int. J. Comput Vis*,91:200-215 (2011).
Saragih et al., "Real-time Avatar Animation from a Single Image", International Conference on Automatic Face & Gesture Recognition and Workshops, IEEE, p. 117-124 (2011).
Seol et al., "Weighted Pose Space Editing for Facial Animation", The Visual Compouter, 28(3): 319-327 (Mar. 2012) http://www.researchgate.net/publication/225213667_Weighted_pose_space_editing_for_facial_animation.

* cited by examiner

SYSTEM AND METHOD OF TRACKING AN OBJECT

CROSS-REFERENCES TO RELATED APPLICATIONS

This application is a National Stage of International Application No. PCT/AU2014/000451, filed Apr. 17, 2014, and which claims the benefit of Australian Patent Application No. 2013901579, filed Apr. 19, 2013, the disclosure of which is hereby incorporated by reference in its entirety for all purposes.

FIELD OF THE INVENTION

The present invention relates to image analysis. In particular, although not exclusively, the invention relates to detecting and tracking objects in a sequence of images.

BACKGROUND TO THE INVENTION

Digital imagery has become commonplace in recent years, and cameras are commonly included in mobile phones, laptops, security systems and the like. Huge amounts of image data are thus being captured, and, as such, it can be difficult to efficiently analyse the data.

Automatic image analysis can be used to process large amounts of data within a short time, and has thus been the topic of many research projects. Object detection, and in particular facial detection, is an important tool in automatic image analysis as it enables analysis of a structure of an image.

The use of active appearance models (AAMs) is popular in facial detection applications, and uses a statistical model that is built using training data to detect a face in an image. An AAM is matched to a face using a shape and appearance of the face. AAMs can be used to model types of objects other than faces, but each model is typically specific to a certain type of object.

A problem with AAMs of the prior art is that they do not work well with appearance variations that are not present in the training data, or when large illumination variation or occlusion is present. Furthermore, AAMs are generally complex.

Constrained local models (CLMs) provide certain improvements over AAMs with respect to some of the problems described above. A CLM is fitted to an object by locating sets of points on a target image, wherein the sets of points are constrained by a statistical shape model.

A problem with CLMs of the prior art is that the modelling process can be complex and time consuming. Attempts at reducing complexity can result in a system that is not sufficiently robust and/or wherein the model is not accurate. Similarly, such systems are not particularly suited to complexity-sensitive applications such as real time and mobile applications.

Accordingly, there is a need for an improved system and method of tracking a non-rigid object.

OBJECT OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

SUMMARY OF THE INVENTION

According to a first aspect, the invention resides in a method of tracking a non-rigid object in a plurality of images including:

generating a first set of parameters for a parameterised shape model by fitting the parameterised shape model to an object in a first image of the plurality of images, wherein the parameterised shape model is fitted to the object in the first image according to one or more constraints defined independently of the object; and generating a second set of parameters for the parameterised shape model by fitting the parameterised shape model to the object in a second image of the plurality of images, wherein the parameterised shape model is fitted to the object in the second image according to:

the one or more constraints defined independently of the object; and the first set of parameters;

wherein the first and second sets of parameters define a tracking of the non-rigid object between the first and second images.

Preferably, the object is a face.

Preferably, the parameterised shape model includes a plurality of land-mark points, and wherein fitting the parameterised shape model comprises matching the plurality of land-mark points to points of an image.

Preferably, the one or more constraints that are defined independently of the object comprise parameters of a constrained local model (CLM).

Preferably, the CLM is generated according to training data.

Preferably, the training data includes data of the same type as the object in the first and second images.

Preferably, fitting the CLM comprises alternating between computing mean shift vectors and regularisation of the mean shift vectors.

Preferably, the parameterised shape model is fitted to the object in the second image according to a cost function, the cost function providing a weighting between the one or more constraints and the first set of parameters.

Preferably, a solution to the minimisation of the cost function can be expressed as a solution for the shape model for the first and second images as follows:

$$\Delta p = -((1-\lambda)(\rho\tilde{\Lambda}^{-1}+J'J)+\lambda J'_{ATM}J_{ATM})^{-1}((1-\lambda)(\rho\tilde{\Lambda}^{-1}p - J'v) + J_{ATM}v_{ATM})$$

wherein:

p comprises the shape parameters;

Δp is an update of the shape parameters;

v is a mean shift vector for each landmark point;

$J_{ATM}$ is a Jacobian with respect to a current shape deformation;

$v_{ATM}$ is an error between an image warped using the current shape parameters and a template of the object;

λ is a weighting factor;

$\tilde{\Lambda}$ is a diagonal matrix of eigenvalues of shape vectors obtained from training data; and J is a Jacobian matrix of the shape model.

Preferably, the method further comprises:

generating a third set of parameters for the parameterised shape model by fitting the parameterised shape model to the object in a third image of the plurality of images, wherein the parameterised shape model is fitted to the object in the third image according to:

the one or more constraints defined independently of the object; and a pose weighted combination of the first and second parameters.

Preferably, fitting the parameterised shape model to the object further comprises:

updating the parameters of the parameterised shape model using compositional regression and a regressor tailored to the parameters.

Preferably, the regressor is determined using training data.

Preferably, the compositional regression is performed on a mouth and eyes of the object.

According to a second aspect, the invention resides in a system for tracking a non-rigid object, the system including:

a data interface, for receiving a plurality of images;

a processor coupled to the data interface; and a memory coupled to the processor, the memory including computer readable instruction code for:

generating a first set of parameters for a parameterised shape model by fitting the parameterised shape model to an object in a first image of the plurality of images, wherein the parameterised shape model is fitted to the object in the first image according to one or more constraints defined independently of the object; and generating a second set of parameters for the parameterised shape model by fitting the parameterised shape model to the object in a second image of the plurality of images, wherein the parameterised shape model is fitted to the object in the second image according to:

the one or more constraints defined independently of the object; and the first set of parameters, wherein the first and second sets of parameters define a tracking of the non-rigid object between the first and second images.

Preferably, the system further comprises a camera, coupled to the processor, for capturing the plurality of images.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which:

FIG. 3b illustrates a side view of the shape data of FIG. 3a;

Figure 1:
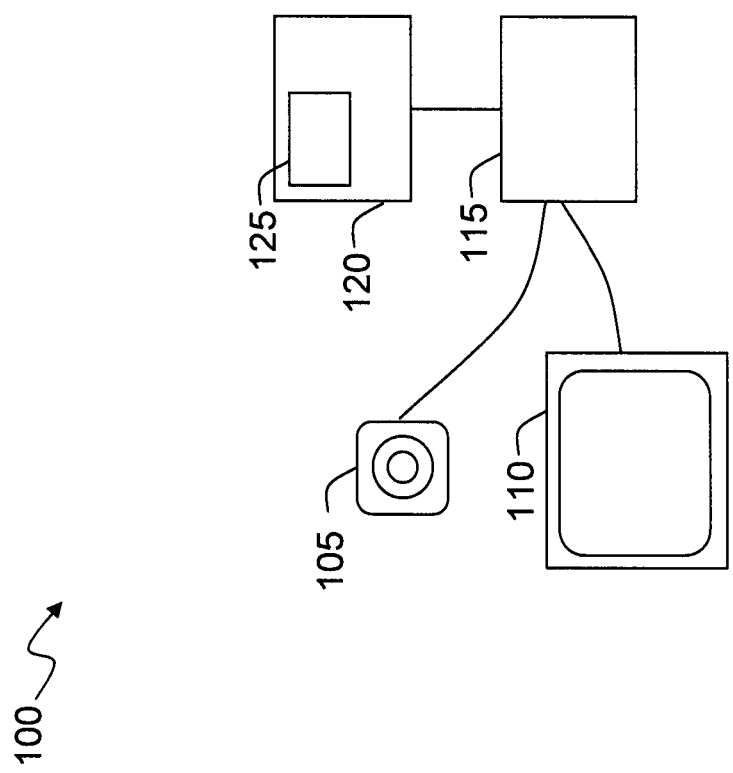
FIG. 1 illustrates a facial tracking system according to an embodiment of the present invention.

Those skilled in the art will appreciate that minor deviations from the layout of components as illustrated in the drawings will not detract from the proper functioning of the disclosed embodiments of the present invention.

DETAILED DESCRIPTION OF THE INVENTION

Embodiments of the present invention comprise systems and methods of tracking non-rigid objects. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

According to one aspect, the invention resides in a method of tracking a non-rigid object in a plurality of images including: generating a first set of parameters for a parameterised shape model by fitting the parameterised shape model to an object in a first image of the plurality of images, wherein the parameterised shape model is fitted to the object in the first image according to one or more constraints defined independently of the object; and generating a second set of parameters for the parameterised shape model by fitting the parameterised shape model to the object in a second image of the plurality of images, wherein the parameterised shape model is fitted to the object in the second image according to: the one or more constraints defined independently of the object; and the first set of parameters, wherein the first and second sets of parameters define a tracking of the non-rigid object between the first and second images.

Advantages of certain embodiments of the present invention include providing a robust and accurate tracking of objects.

According to certain embodiments, the tracking of the object can be done faster and/or with better precision.

According to certain embodiments, the present invention provides more robust object tracking when there is large variation in the object or face between images, or large changes in pose are present.

FIG. 1 illustrates a facial tracking system 100 according to an embodiment of the present invention.

The facial tracking system 100 includes a camera 105, a display screen 110, a processor 115 and a memory 120. The camera 105, the display screen 110 and the memory 120 are coupled to the processor 115. The memory includes program code 125, executable by the processor 115, for performing facial tracking, as described in further detail below.

The system 100 tracks a face of a user using the camera 105, and presents results of the facial tracking to the user on the display screen 110. For example, the facial tracking can be used to animate an avatar in real time, determine an expression of the user, provide feedback to the system 100 in the form of commands, or fit one or more virtual items to the user such as a hat, partial mask or glasses.

The system 100 can, for example, comprise a low processing power device, such as a mobile telephone, personal digital assistant (PDA), tablet computer, a personal computer, or other similar device or combination thereof.

Initially, a plurality of images of a user are received from the camera 105. The plurality of images form part of a video sequence, and can be received as they are captured. According to alternative embodiments, the video sequence is pre-recorded and retrieved from memory.

A parameterised shape model is then registered to the images. The parameterised shape model includes parameters in the form of landmark points corresponding to points of the face, such as eye, mouth and nose points. Examples of suitable parameterised shape models include a constrained local model (CLM), wherein the landmark points are constrained by a statistical shape model.

The parameterised shape model is fitted to the images by maximising a likelihood that the landmark points are aligned with corresponding landmark points in each image, while considering a temporal prior across images. The temporal prior improves the parameterised shape model, as a difference in appearance of the face of the user between several frames is likely to be small.

The temporal prior comprises a difference between a template of the face obtained from previous frames and the image, warped using the current shape parameters. The template is advantageously updated as new frames are made available, in order to account for sources of variation in the appearance of the face.

The parameterised shape model can be fitted to the images by using the method disclosed in J. M. Saragih, S. Lucey, and J. F. Cohn "Deformable model fitting by regularized landmark mean-shift", *International Journal of Computer Vision*, 91:200-215, 2011, modified to include the temporal prior.

In particular, a cost-function based solution for the shape model for each image can be written as:

$$\Delta p = -((1-\lambda)(\rho \tilde{\Lambda}^{-1} + J'J) + \lambda J'_{ATM} J_{ATM})^{-1}((1-\lambda)(\rho \tilde{\Lambda}^{-1} p - J'v) + J_{ATM} v_{ATM})$$

wherein:
  p comprises parameters of the model;
  $\Delta p$ is an update of the parameters;
  v is a mean shift vector for each landmark point;
  $J_{ATM}$ is a Jacobian of an image with respect to the current shape deformation;
  $v_{ATM}$ is an error between the image warped using the parameters and the template of the object, wherein the template and the warped image forms the image prior;
  $\lambda$ is a weight assigned to the temporal prior;
  $\tilde{\Lambda}$ is a diagonal matrix of eigenvalues of shape vectors obtained from training data; and
  J is a Jacobian matrix of the shape model.

The template T is updated as new frames are made available, in order to account for sources of variation in the appearance of the face. Instead of simply taking the sample from the previous frame, which may lead to drift, a dictionary of known appearances is built, each of which may be used as the template.

The Jacobian $J_{ATM}$ can define, for example, a Jacobian of an image with respect to a piecewise affine warp. The ATM (Active Template Model) is essentially an AAM, but with a subset of templates obtained as a video sequence progresses, instead of a model obtained from a training set.

As the user has a constant identity in the plurality of images, expression and pose are major sources of changes in appearance. To minimise the influence of these changes in expression on the template, the template is defined with reference to the shape. Changes in pose are accounted for by constructing a dictionary of templates captured previously at different poses, with a few samples per pose to account for variability within a pose. The number of templates per orientation is, however, advantageously kept small to reduce complexity in the system 100.

Subsequent to fitting the model to the image, a regression step is performed to improve accuracy of the fit of the model. The regression step is applied to the points of the object that are typically most distinctive, such as eye and mouth points.

A compositional regression method is used that iteratively updates the shape using regressors tailored to the current shape estimate. Each regressor has a cluster of shapes associated to it, determined using the training set. At each iteration, the regressor associated with the cluster having its center closest to the current shape is used to estimate the shape update. This shape update is then used to update the current shape iteratively until the shape converges.

Once the shape has been updated, the shape can be used by the system 100, by animating an avatar or by fitting virtual items to the user image, for example. In order to reduce delay in the system 100, the above steps are advantageously performed as the images are received from the camera 105. This enables an output of the system 100, e.g. the animated avatar, to be animated and displayed to the user on the display screen 110 as the input is being provided.

According to an alternative embodiment (not shown), the system 100 sends the plurality of images to a server that processes the images and returns model parameters. This is particularly advantageous when the processor 115 is not sufficiently powerful to perform all steps sufficiently fast. Alternatively again, the server can generate the output directly for display on the display screen 110.

Figure 2:
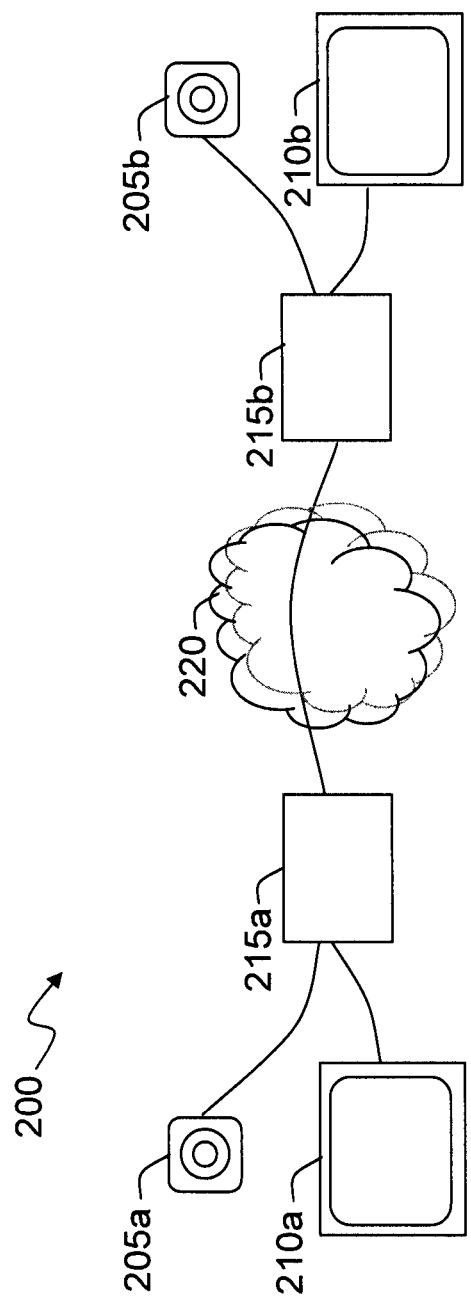
FIG. 2 illustrates a video conferencing system according to an embodiment of the present invention.

FIG. 2 illustrates a video conferencing system 200 according to an embodiment of the present invention. The video conferencing system 200 includes avatar animation, and is based upon face tracking similar to that described above with reference to FIG. 1.

The video conferencing system 200 includes a first camera 205a, a first display screen 210a and a first computing device 215a, at a first location and forming a first part of the video conferencing system 200.

The first camera 205a, the first display screen 210a and the first computing device 215a can, for example, comprise components of a single device, such as a laptop, or components of a specialised video conferencing system.

The video conferencing system 200 further includes a second camera 205b, a second display screen 210b and a second computing device 215b, at a second location and forming a second part of the video conferencing system 200. The second camera 205b, the second display screen 210b and the second computing device 215b can be identical or similar to the first camera 205a, the first display screen 210a and the first computing device 215a.

The system 100 tracks faces of first and second users using the cameras 205a, 205b, and applies facial expressions from the first and second users to first and second avatars. The first and second avatars, once animated with the facial expressions of the respective users, are then transmitted to the second and first users, respectively, thus providing video communication between the users.

Animation of the avatar can comprise applying a 3D model, Active Appearance Model (AAM) parameters, or other shape data to the avatar data, and may include applying a mapping function to the shape data according to the avatar data. Furthermore, animation of the avatar can be performed according to a plurality of source-avatar mapping functions, as described for example in J. Saragih, S. Lucey and J. F. Cohn, "Real-time Avatar Animation from a Single Image", *IEEE International Conference on Automatic Face and Gesture Recognition* (AFGR) 2011.

In this case, the face tracking described above is used to obtain an estimate of the shapes of the faces in the video, which is then further refined using an Active Appearance Model (AAM).

Figure 3A:
FIG. 3a illustrates a front view of shape data, according to an embodiment of the present invention.
Figure 3B:
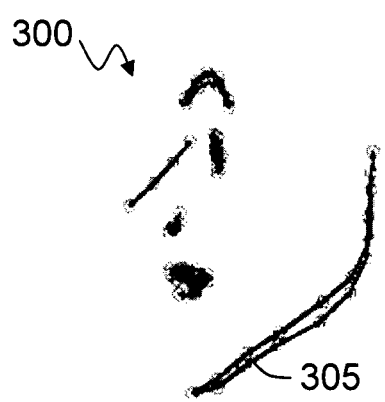

FIG. 3a illustrates a front view of shape data 300, according to an embodiment of the present invention, and FIG. 3b illustrates a side view of the shape data 300.

The shape data 300 comprises a plurality of 3D points 305, corresponding to features of a user's face. The features can include an eye, a mouth, eyebrows, jaw shape, or any other features. As defined herein, the parameterised shape model is mapped to such features of the user's face.

Figure 4:
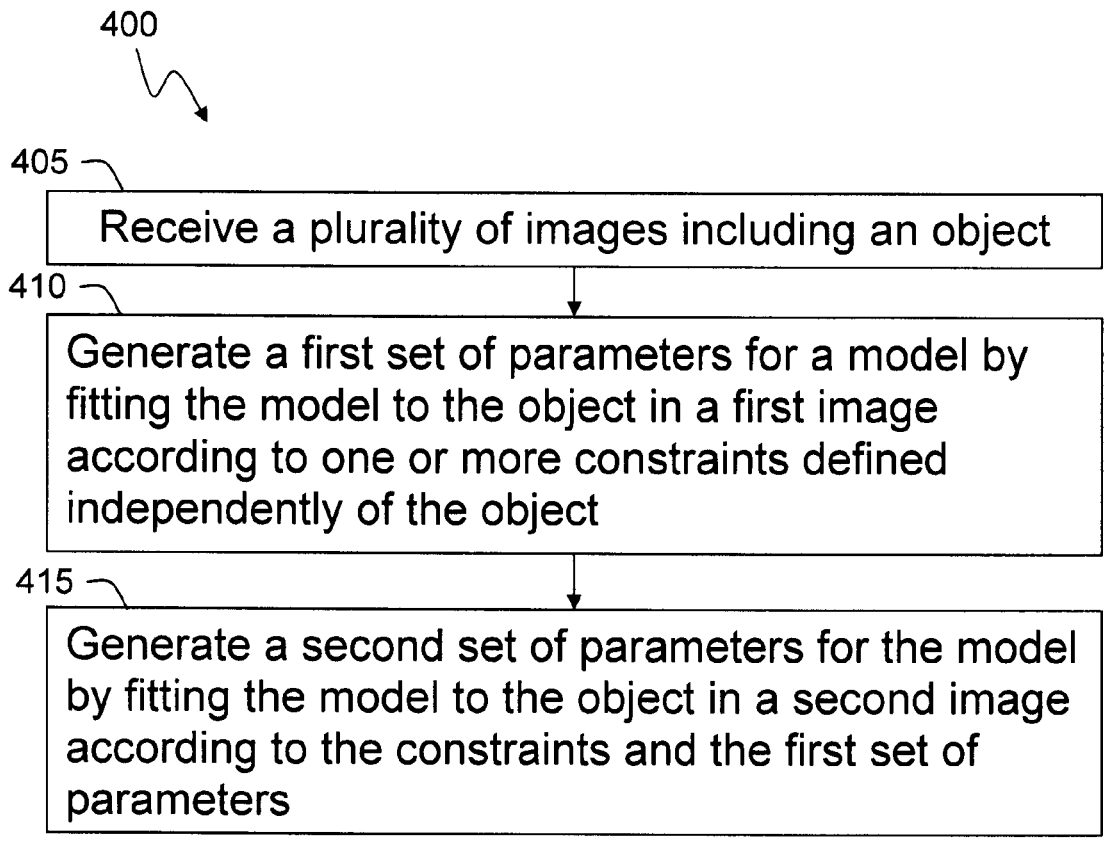
FIG. 4 illustrates a method of tracking an object in a video, according to an embodiment of the present invention.

FIG. 4 illustrates a method 400 of tracking an object in a video, according to an embodiment of the present invention.

In step 405, a plurality of images is received. The plurality of images advantageously comprises a video sequence of a single user, as discussed above. Alternatively, the plurality of images can be stored on a memory and retrieved for processing.

In step 410, a first set of parameters is generated for a parameterised shape model. This is performed by fitting the parameterised shape model to the object in a first image of the plurality of images. The parameterised shape model is fitted to the object in the first image according to one or more constraints defined independently of the object.

In step 415, a second set of parameters is generated for the parameterised shape model by fitting the parameterised shape model to the object in a second image of the plurality of images. The parameterised shape model is fitted to the object in the second image according to the one or more constraints defined independently of the object and the first set of parameters.

By considering a temporal prior, as described in the method 400 above, a solution is provided that provide accurate facial tracking while being consistent across images.

Figure 5:
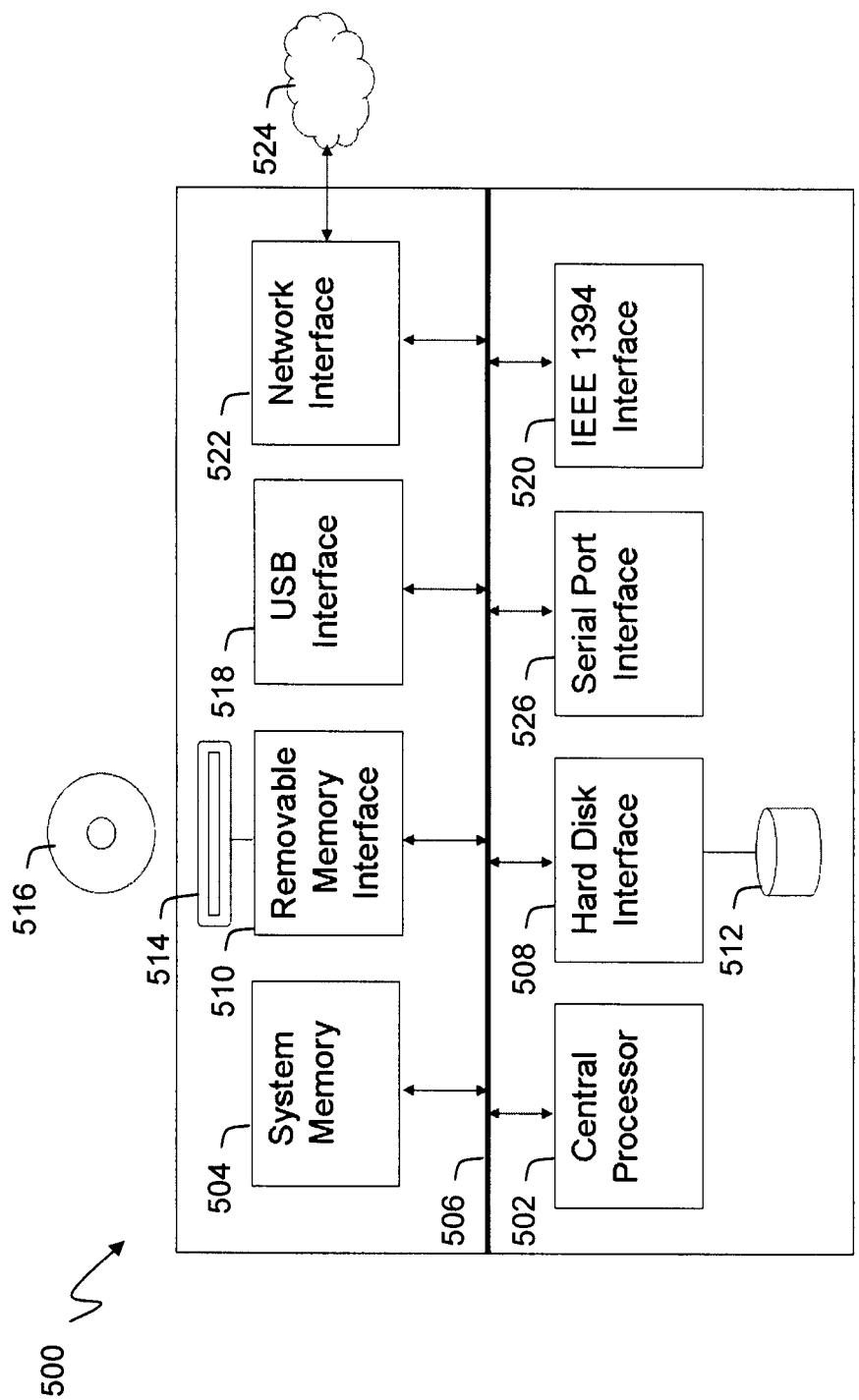
FIG. 5 diagrammatically illustrates a computing device, according to an embodiment of the present invention.

FIG. 5 diagrammatically illustrates a computing device 500, according to an embodiment of the present invention. The system 100 of FIG. 1, and the first and second computing devices 215a, 215b of FIG. 1 can be similar or identical to the computing device 500. Similarly, the method 400 of FIG. 4 can be implemented using the computing device 500.

The computing device 500 includes a central processor 502, a system memory 504 and a system bus 506 that couples various system components, including coupling the system memory 504 to the central processor 502. The system bus 506 may be any of several types of bus structures including a memory bus or memory controller, a peripheral bus, and a local bus using any of a variety of bus architectures. The structure of system memory 504 is well known to those skilled in the art and may include a basic input/output system (BIOS) stored in a read only memory (ROM) and one or more program modules such as operating systems, application programs and program data stored in random access memory (RAM).

The computing device 500 can also include a variety of interface units and drives for reading and writing data. The data can include, for example, a displacement between the camera and the display screen as discussed above.

In particular, the computing device 500 includes a data storage interface 508 and a removable memory interface 510, respectively coupling a solid state or hard disk drive 512 and a removable memory drive 514 to the system bus 506. Examples of removable memory drives 514 include magnetic disk drives and optical disk drives. The drives and their associated computer-readable media, such as a Digital Versatile Disc (DVD) 516 provide non-volatile storage of computer readable instructions, data structures, program modules and other data for the computer system 500. A single hard disk drive 512 and a single removable memory drive 514 are shown for illustration purposes only and with the understanding that the computing device 500 can include several similar drives. Furthermore, the computing device 500 can include drives for interfacing with other types of computer readable media.

The computing device 500 may include additional interfaces for connecting devices to the system bus 506. FIG. 5 shows a universal serial bus (USB) interface 518 which may be used to couple a device to the system bus 506. For example, an IEEE 1394 interface 520 may be used to couple additional devices to the computing device 500. Examples of additional devices include cameras for receiving images or video, or microphones for recording audio.

The computing device 500 can operate in a networked environment using logical connections to one or more remote computers or other devices, such as a server, a router, a network personal computer, a peer device or other common network node, a wireless telephone or wireless personal digital assistant. The computing device 500 includes a network interface 522 that couples the system bus 506 to a local area network (LAN) 524. Networking environments are commonplace in offices, enterprise-wide computer networks and home computer systems.

A wide area network (WAN), such as the Internet, can also be accessed by the computing device, for example via a modem unit connected to a serial port interface 526 or via the LAN 524.

Transmission of shape parameters and/or video can be performed using the LAN 524, the WAN, or a combination thereof.

It will be appreciated that the network connections shown and described are exemplary and other ways of establishing a communications link between computers can be used. The existence of any of various well-known protocols, such as TCP/IP, Frame Relay, Ethernet, FTP, HTTP and the like, is presumed, and the computing device 500 can be operated in a client-server configuration to permit a user to retrieve data from, for example, a web-based server.

The operation of the computing device 500 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCs, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

In summary, advantages of certain embodiments of the present invention include an ability to provide, at low complexity, a robust person specific model. Accordingly, more efficient avatar animations can be provided.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The claims defining the invention are:

1. A method of tracking a non-rigid object in a plurality of images including:
   generating a first set of parameters for a parameterised shape model by matching a first set of land-mark points to points in a first image of the plurality of images, wherein the first set of land-mark points is fitted to an object in the first image according to one or more constraints defined independently of the object; and
   generating a second set of parameters for the parameterised shape model by matching a second set of land-mark points to points in a second image of the plurality of images, wherein the second set of land-mark points is fitted to the object in the second image according to:
      the one or more constraints defined independently of the object; and
      the first set of parameters,
   wherein the first and second sets of parameters define a tracking of the non-rigid object between the first and second images.

2. The method of claim 1, wherein the object is a face.

3. The method of claim 1, wherein the one or more constraints that are defined independently of the object comprise parameters of a constrained local model (CLM).

4. The method of claim 3, wherein the CLM is generated according to training data.

5. The method of claim 4, wherein the training data includes data of the same type as the object in the first and second images.

6. The method of claim 3, wherein fitting the CLM comprises alternating between computing mean shift vectors and regularisation of the mean shift vectors.

7. The method of claim 1, wherein the parameterised shape model is fitted to the object in the second image according to a cost function, the cost function providing a weighting between the one or more constraints and the first set of parameters.

8. The method of claim 7, wherein a solution to the minimisation of the cost function can be expressed as a solution for the shape model for the first and second images as follows:

$$\Delta p = -((1-\lambda)(\rho \tilde{\Lambda}^{-1} + J'J) + \lambda J'_{ATM} J_{ATM})^{-1}((1-\lambda)(\rho \tilde{\Lambda}^{-1} p - J'v) + J_{ATM} v_{ATM})$$

wherein:
   p comprises the shape parameters;
   $\Delta p$ is an update of the shape parameters;
   v is a mean shift vector for each landmark point;
   $J_{ATM}$ is a Jacobian with respect to a current shape deformation;
   $v_{ATM}$ is an error between an image warped using the current shape parameters and a template of the object;
   $\lambda$ is a weighting factor;
   $\tilde{\Lambda}$ is a diagonal matrix of eigenvalues of shape vectors obtained from training data; and
   J is a Jacobian matrix of the shape model.

9. The method of claim 1, further comprising:
   generating a third set of parameters for the parameterised shape model by fitting the parameterised shape model to the object in a third image of the plurality of images, wherein the parameterised shape model is fitted to the object in the third image according to:
      the one or more constraints defined independently of the object; and
      a pose weighted combination of the first and second parameters.

10. The method of claim 1, wherein fitting the parameterised shape model to the object further comprises:
    updating the parameters of the parameterised shape model using compositional regression and a regressor tailored to the parameters.

11. The method of claim 10, wherein the regressor is determined using training data.

12. The method of claim 10, wherein the compositional regression is performed on a mouth and eyes of the object.

13. A non-transitory computer-readable medium, including computer-executable instructions stored thereon that when executed by a processor, will cause the processor to perform the method of claim 1.

14. A system for tracking a non-rigid object, the system including:
    a data interface, for receiving a plurality of images;
    a processor coupled to the data interface; and
    a memory coupled to the processor, the memory including computer readable instruction code for:
       generating a first set of parameters for a parameterised shape model by matching a first set of land-mark points to points in a first image of the plurality of images, wherein the first set of land-mark points is fitted to an object in the first image according to one or more constraints defined independently of the object; and
       generating a second set of parameters for the parameterised shape model by matching a second set of land-mark points to points in a second image of the plurality of images, wherein the second set of land-mark points is fitted to the object in the second image according to:
          the one or more constraints defined independently of the object; and
          the first set of parameters,
       wherein the first and second sets of parameters define a tracking of the non-rigid object between the first and second images.

15. The system of claim 14, further comprising:
    a camera, coupled to the processor, for capturing the plurality of images.

16. A method of tracking a non-rigid object in a plurality of images including:
    generating a first set of parameters for a parameterised shape model by fitting the parameterised shape model to an object in a first image of the plurality of images, wherein the parameterised shape model is fitted to the object in the first image according to one or more constraints defined independently of the object; and
    generating a second set of parameters for the parameterised shape model by fitting the parameterised shape model to the object in a second image of the plurality of images, wherein the parameterised shape model is fitted to the object in the second image according to a cost function that provides a weighting between the one or more constraints and the first set of parameters, wherein the first and second sets of parameters define a tracking of the non-rigid object between the first and second images, and wherein a solution to the minimisation of the cost function can be expressed as a solution for the shape model for the first and second images as follows:

$$\Delta p = -((1-\lambda)(\rho \tilde{\Lambda}^{-1} + J'J) + \lambda J'_{ATM} J_{ATM})^{-1}((1-\lambda)(\rho \tilde{\Lambda}^{-1} p - J'v) + J_{ATM} v_{ATM})$$

wherein:
- p comprises the shape parameters;
- $\Delta p$ is an update of the shape parameters;
- v is a mean shift vector for each landmark point;
- $J_{ATM}$ is a Jacobian with respect to a current shape deformation;
- $v_{ATM}$ is an error between an image warped using the current shape parameters and a template of the object;
- $\lambda$ is a weighting factor;
- $\tilde{\Lambda}$ is a diagonal matrix of eigenvalues of shape vectors obtained from training data; and
- J is a Jacobian matrix of the shape model.

* * * * *

UNITED STATES PATENT AND TRADEMARK OFFICE
CERTIFICATE OF CORRECTION

PATENT NO. : 9,747,695 B2
APPLICATION NO. : 14/785557
DATED : August 29, 2017
INVENTOR(S) : Simon Michael Lucey It is certified that error appears in the above-identified patent and that said Letters Patent is hereby corrected as shown below:

Column 2, Lines 46-47; Column 5, Lines 34-35; Column 9, Lines 54-55; and Column 11, Lines 8-9, each occurrence of the formula should appear as follows:

$$\Delta p = -\left((1-\lambda)\left(\rho\tilde{A}^{-1}+J'J\right)+\lambda J'_{ATM}J_{ATM}\right)^{-1}\left((1-\lambda)\left(\rho\tilde{A}^{-1}p-J'v\right)+J_{ATM}v_{ATM}\right)$$

Signed and Sealed this
Nineteenth Day of December, 2017

Joseph Matal
*Performing the Functions and Duties of the
Under Secretary of Commerce for Intellectual Property and
Director of the United States Patent and Trademark Office*